(12) United States Patent
Ren et al.

(10) Patent No.: US 8,761,108 B2
(45) Date of Patent: Jun. 24, 2014

(54) TABLE BASED LINK ADAPTION FOR WIRELESS COMMUNICATION TRANSMISSIONS WITH ONE CODEWORD

(75) Inventors: Hong Ren, Kanata (CA); Girum Alebachew Fantaye, Ottawa (CA); Xixian Chen, Ottawa (CA); Ping Yu, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 179 days.

(21) Appl. No.: 13/532,144

(22) Filed: Jun. 25, 2012

(65) Prior Publication Data

US 2013/0343290 A1 Dec. 26, 2013

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| | | | | |
|---|---|---|---|---|
| 8,565,177 B2 * | 10/2013 | Ball et al. | | 370/329 |
| 2011/0019768 A1 | 1/2011 | Nammi et al. | | |
| 2012/0182944 A1 * | 7/2012 | Sorrentino et al. | | 370/329 |
| 2012/0314678 A1 * | 12/2012 | Ko et al. | | 370/329 |
| 2012/0320862 A1 * | 12/2012 | Ko et al. | | 370/329 |
| 2013/0094468 A1 * | 4/2013 | Ko et al. | | 370/329 |
| 2013/0170469 A1 * | 7/2013 | Yu et al. | | 370/330 |
| 2013/0176949 A1 * | 7/2013 | Sun | | 370/329 |
| 2013/0322241 A1 * | 12/2013 | Fantaye et al. | | 370/232 |

FOREIGN PATENT DOCUMENTS

| | | |
|---|---|---|
| EP | 1 024 622 A2 | 8/2000 |
| EP | 1 811 799 A1 | 7/2007 |
| WO | 2011079849 A1 | 7/2011 |
| WO | 2013102839 A1 | 7/2013 |

OTHER PUBLICATIONS

International Search Report and Written Opinion dated Jan. 7, 2014 for International Application No. PCT/IB2013/053817, International Filing Date May 10, 2013 consisting of 22 pages.
PCT Invitation to Pay Additional Fees, Form PCT/ISA/206, for corresponding International Application No. PCT/IB2013/053817; International Filing Date: May 10, 2013 consisting of 5-pages.

* cited by examiner

*Primary Examiner* — Anh-Vu Ly
(74) *Attorney, Agent, or Firm* — Christopher & Weisberg, P.A.

(57) ABSTRACT

A radio resource management method is provided. Data for transmission is stored. The stored data is associated with user equipment (UE). A channel quality is estimated. A first modulation and coding scheme (MCS) is determined based at least in part on the estimated channel quality. A first number of scheduling blocks (SBs) required to transmit the stored data is determined based at least in part on the first MCS. The first number of SBs are a minimum of an initial number of SBs and available amount of SBs. A link quality is calculated based at least in part on a channel condition associated with the first number of SBs. A second MCS is determined based at least in part on the calculated link quality and a link quality requirement.

21 Claims, 11 Drawing Sheets

| # of SBs / TBS Index | 1 | 2 | ... | ... | 100 |
|---|---|---|---|---|---|
| 0 | $TBS_{0,1}$ | $TBS_{0,2}$ | ... | ... | $TBS_{0,100}$ |
| 1 | $TBS_{1,1}$ | $TBS_{1,2}$ | ... | ... | $TBS_{1,100}$ |
| ... | ... | ... | ... | ... | ... |
| 28 | $TBS_{28,1}$ | $TBS_{28,2}$ | ... | ... | $TBS_{28,100}$ |

Increase Number of SBs →

Increae TBS Index →

| # of SBs / MCS Index | 1 | 2 | ... | ... | 100 |
|---|---|---|---|---|---|
| 0 | $R_{0,1}$ | $R_{0,2}$ | ... | ... | $R_{0,100}$ |
| 1 | $R_{1,1}$ | $R_{1,2}$ | ... | ... | $R_{1,100}$ |
| ... | ... | ... | ... | ... | ... |
| 28 | $R_{28,1}$ | $R_{28,2}$ | ... | ... | $R_{28,100}$ |

Increase Number of SBs →

Increase MCS Index →

44

TABLE BASED LINK ADAPTION FOR WIRELESS COMMUNICATION TRANSMISSIONS WITH ONE CODEWORD

TECHNICAL FIELD

The present invention relates to wireless communications, and in particular to a device, system and method for performing modified link adaptation.

BACKGROUND

The demands on wireless communication networks as a medium for communicating data has been steadily increasing due in part the exponential growth of mobile device users. In order to accommodate the increased amount of mobile device traffic on the wireless communication network, network operators have been forced to implement spectrum resource management techniques to more efficiently use the limited spectrum allocated to them. These efficient spectrum management techniques for wireless communication networks are often referred to as radio resource management (RRM).

Several RRM techniques that have been implemented include dynamic RRM techniques that actively adjust the communication parameters according to traffic load, quality, path loss and interference, among other characteristics. One such RRM technique is referred to as link adaptation in which the purpose of link adaptation is to determine the appropriate modulation and level of error correction coding that is applied to meet a specified error probability. In particular, link adaptation uses information on communication link quality that is obtained either from measurements or from reporting of the channel state information (CSI) by the receiver. Selection of the appropriate modulation and error correction coding for each mobile device allows the wireless communication network to efficiently utilize the spectrum according to wireless communication characteristics.

The amount of time to perform link adaptation for a mobile device is typically confined to a transmission time interval (TTI). The transmission time interval in a $3^{rd}$ Generation Partnership Project (3GPP) Long Term Evolution (LTE) system is 1 millisecond (ms). A transmission resource of 180 kHz in frequency within one TTI is referred to as a scheduling block (SB) in which, in 3GPP, a physical resource block (PRB) is half a TTI in time or a slot. Moreover, there are several modulation schemes to select from such as quadrature phase shift keying (QPSK), sixteen quadrature amplitude modulation (16QAM) and 64QAM. Each modulation scheme may also include several possible levels of channel coding in which the combination of modulation scheme and coding, i.e., Modulation and Coding Scheme (MCS), provide numerous choices for RRM.

However, link adaptation is not without limits. For example, scheduling and link adaptation typically have to be performed one queue at a time because only after SBs have been allocated to a mobile device are the remaining SBs available for the other queues known to the scheduler. A mobile device can have one or more associated queues thereby making the efficient scheduling of multiple mobile devices even more challenging. In other words, scheduling and link adaptation techniques take into consideration the unallocated scheduling blocks. As such, the number of mobile devices that can be scheduled in a transmission time interval is limited by the processing time required for link adaptation for one mobile device.

Moreover, the task of selecting the optimal MCS and SBs given the numerous choices is often time consuming and further limits the amount of mobiles devices that can be scheduled per transmission time interval. For example, a time consuming link adaptation technique may use over half of the transmission time interval to determine the optimum MCS for one mobile device such that link adaptation will not be performed for the other mobile devices because there is not enough time left in the TTI. Moreover, the scheduled mobile devices may not even use the total available bandwidth such that other mobile devices would have been scheduled if the link adaptation process had not consumed so much time. Even if the total available bandwidth is utilized, it is likely that the bandwidth is not utilized efficiently by the scheduled mobile devices.

SUMMARY

The present invention advantageously provides an apparatus, system and method for performing modified link adaptation.

According to one embodiment, a radio resource management apparatus is provided. The apparatus includes a memory configured to store data for transmission in which the data is associated with a user equipment (UE). A processor is in communication with the memory. The processor is configured to estimate a channel quality and determine a first modulation and coding scheme (MCS) based at least in part on the estimated channel quality. The processor is configured to determine an initial number of scheduling blocks (SBs) required to transmit the stored data based at least in part on the first MCS. The processor is also configured to determine a first number of SBs in which the first number of SBs is a minimum of the initial number of SBs and available number of SBs. The processor is configured to set a current number of SBs to the first number of SBs in response to determining the first number of SBs. The processor is further configured to calculate a link quality based at least in part on a channel condition associated with the first number of SBs. The processor is configured to determine a second MCS based at least in part on the calculated link quality. The processor is also configured to set a current MCS to the second MCS in response to determining the second MCS. The stored data is scheduled for transmission based at least in part on the current MCS and current number of SBs.

According to another embodiment, a radio resource management method is provided. Data for transmission is stored. The stored data is associated with a user equipment (UE). A channel quality is estimated. A first modulation and coding scheme (MCS) is determined based at least in part on the estimated channel quality. An initial number of scheduling blocks (SBs) required to transmit the stored data is determined based at least in part on the first MCS. A first number of SBs is determined in which the first number of SBs is a minimum of the initial number of SBs and available amount of SBs. A current number of SBs is set to the first number of SBs in response to determining the first number of SBs. A link quality is calculated based at least in part on a channel condition associated with the first number of SBs. A second MCS is determined based at least in part on the calculated link quality. A current MCS is set to the second MCS in response to determining the second MCS. The stored data is scheduled for transmission based at least in part on the current MCS and current number of SBs.

According to another embodiment, a radio resource management apparatus is provided. The apparatus includes a memory. The memory is configured to store data for retransmission in which the data is associated with a user equipment (UE). The apparatus includes a processor in communication with the memory. The processor is configured to determine a first number of scheduling blocks (SBs) based at least in part on a number of previously used SBs. The processor is also configured to calculate a link quality that corresponds to a channel condition associated with the first number of SBs. The processor is further configured to determine a first modulation and coding scheme (MCS) based at least in part on the first number of SBs and calculated link quality. The processor is additionally configured to set a current MCS to the first MCS in response to determining the first MCS. The processor is configured to schedule the stored data for retransmission based at least in part on the current MCS.

According to another embodiment, a method is provided for performing link adaption in a wireless communication system for hybrid automatic repeat request, HARQ, re-transmission. The highest modulation and coding scheme, MCS, supported by a communication channel is determined based at least in part on a number of scheduling blocks (SBs) and transport block size (TBS) associated with a previous HARQ transmission. A second number of SBs is determined based at least in part on the highest MCS. A second TBS is determined based at least in part on the highest MCS and the second number of SBs. The MCS is adjusted based at least in part on the second TBS.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a transport block size (TBS) table arranged in accordance with the principles of the present invention;

FIG. 3 is a link quality requirement table arranged in accordance with the principles of the present invention;

DETAILED DESCRIPTION

Figure 1:
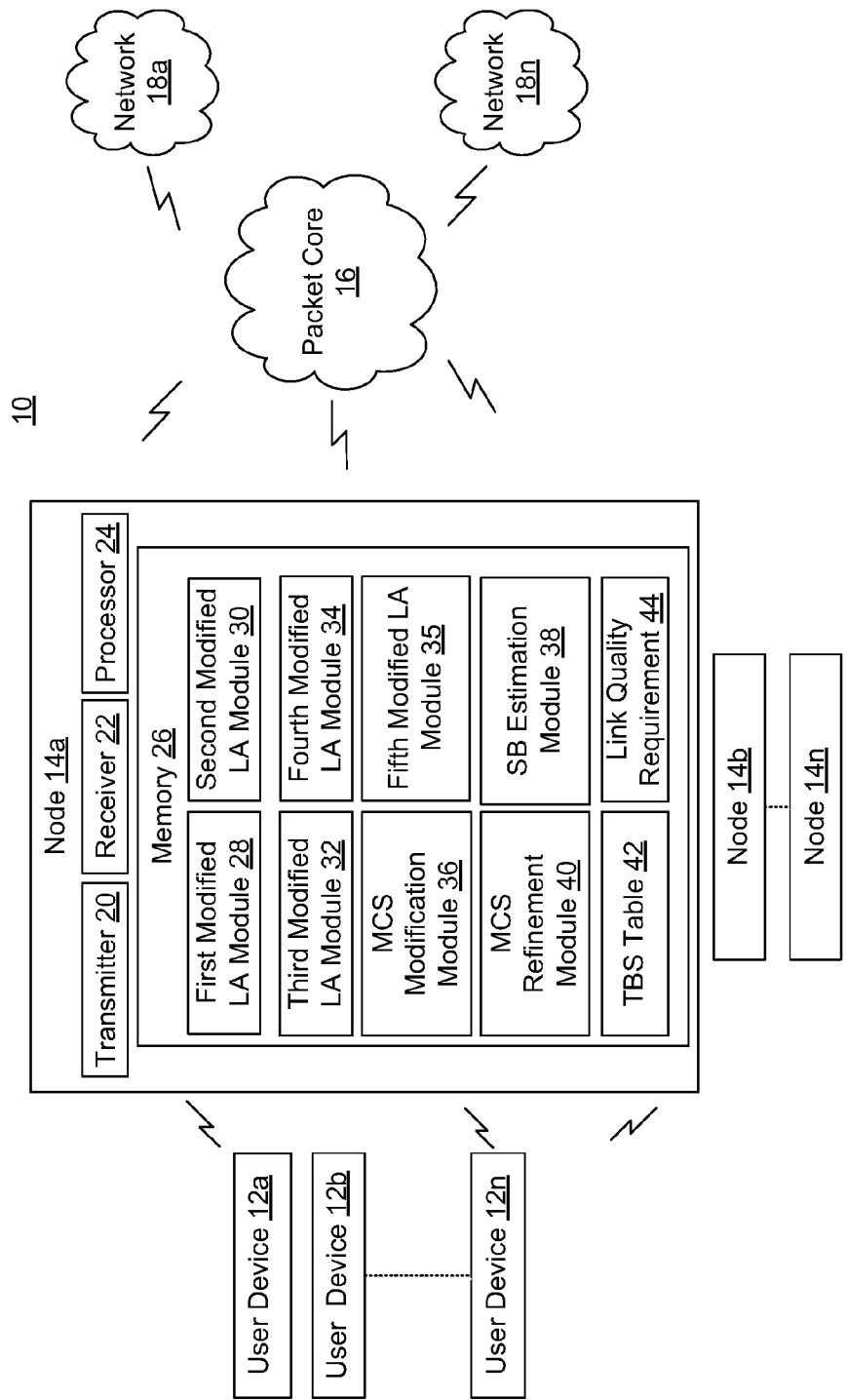
FIG. 1 is a block diagram of an exemplary communication system including modified link adaptation constructed in accordance with the principles of the present invention.

The present invention advantageously provides an apparatus, system and method for performing modified link adaptation. Accordingly, the apparatus, system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawing figures in which like reference designators refer to like elements there is shown in FIG. 1 an exemplary communication system including modified link adaptation constructed in accordance with the principles of the present invention and designated generally as "10." System 10 may include one or more user devices 12a to 12n (collectively referred to as "user device 12"), one or more nodes 14a to 14n (collectively referred to as "node 14"), one or more packet cores 16 (collectively referred to as "packet core 16") and one or more communication networks 18a to 18n (collectively referred to as "network 18").

User device 12 may include transmitter and receiver (not shown) for communicating at least with node 14 and/or user device 12 via a communications network using communication protocols known in the art, e.g., using Internet Protocols along with long term evolution (LTE) wireless communication standards. The communication network may be a mobile or wireless communication network. User device 12 may include mobile devices, tablets, laptops, computers, personal digital assistants (PDAs), servers, LTE enabled user equipment (UE) and the like. System 10 is not limited to LTE but may use another standard such as those following any 3GPP standard.

Node 14 includes transmitter 20, receiver 22, processor 24 and memory 26 in operative communication with each other. Transmitter 20 and receiver 22 provide transmission and reception of data communications to/from user device 12, other nodes 14 and packet core 16, among other communications devices, servers and networks. Node 14 includes processor 24 such as central processing unit (CPU) for performing node functions described herein. Node 14 may include memory 26. In particular, memory 26 may include non-volatile and volatile memory, e.g., non-transitory computer readable medium storing program instructions that may be executed by processor 24 such as to cause processor 24 to perform the functions described herein. Non-volatile memory may include a hard drive, flash memory, memory stick and the like. Also, volatile memory may include random access memory and other memory known in the art.

Memory 26 may store queued data, current TBS, current MCS, current number of SBs, operating TBS, operating MCS and operating number of SBs. The current TBS, MCS and number of SBs correspond to a TBS, MCS and number of SBs, respectively, associated with a data queue undergoing modified link adaptation, i.e., tracks the modified or estimated TBS, MCS and number of SBs during modified link adaptation. The current TBS, MCS and/or number of SBs may be constantly updated during modified link adaptation, e.g., the current numbers of SBs may be updated after the number of SBs have been modified or re-estimated. The operating TBS, MCS and number of SBs correspond to a modified link algorithm output for a data queue associated with user device 12, i.e., indicates the TBS, MCS and number of SBs that are to be utilized to transmit a data queue associated with user device 12, in which modified link adaptation may be performed one data queue at a time. The current and operating MCSs, number of SBs and/or TBSs may be reset to default values after modified link adaptation is performed for a data queue, e.g., current MCS may be reset back to the optimum or maximum MCS.

Memory 26 may also store first modified link adaptation (LA) module, second modified LA module, third modified LA module, fourth modified LA module, modulation and coding scheme (MCS) modification module, scheduling block (SB) estimation module, MCS refinement module, transport block size (TBS) table and link quality requirement table, among other modules and tables.

First modified link adaptation module 28 performs a first modified link adaptation process. For example, the first modified link adaptation module 28 includes instructions, which when executed by processor 24, causes processor 24 to perform the first modified link adaptation process, discussed in detail with respect to FIG. 4. Second modified link adaptation module 30 performs a second modified link adaptation process. For example, the second modified link adaptation module 30 includes instructions, which when executed by processor 24, causes processor 24 to perform the second modified link adaptation process, discussed in detail with respect to FIG. 7. Third modified link adaptation module 32 performs a third modified link adaptation process. For example, the third modified link adaptation module 32 includes instructions, which when executed by processor 24, causes processor 24 to perform the third modified link adaptation process, discussed in detail with respect to FIG. 9. Fourth modified link adaptation module 34 performs a fourth modified link adaptation process. For example, the fourth modified link adaptation module 34 includes instructions, which when executed by processor 24, causes processor 24 to perform the fourth modified link adaptation process, discussed in detail with respect to FIG. 10. Fifth modified link adaptation module 35 performs a fifth modified link adaptation process. For example, the fifth modified link adaptation module 35 includes instructions, which when executed by processor 24, causes processor 24 to perform the fifth modified link adaptation process, discussed in detail with respect to FIG. 11. The modified link adaptation modules are not limited to five modules and can be more or fewer modules depending on which processes are implemented in node 14.

MCS modification module 36 modifies the modulation and coding scheme. For example, MCS modification module 36 includes instructions, which when executed by processor 24, causes processor 24 to perform the MCS modification module process, discussed in detail with respect to FIG. 6. SB estimation module 38 estimates a number of SBs. For example, SB estimation module 38 includes instructions, which when executed by processor 24, causes processor 24 to perform the SB estimation process, discussed in detail with respect to FIG. 5. MCS refinement module 40 modifies or refines the modulation and coding scheme. For example, MCS refinement module includes instructions, which when executed by processor 24, causes processor 24 to perform the MCS refinement process, discussed in detail with respect to FIG. 8. TBS table 42 provides a mapping of a transport block size to a number of SBs and TBS index, discussed in detail with respect to FIG. 2. Link quality requirement table 44 provides a mapping of a link quality that is required to utilize a specific number of SBs and MCS index, discussed in detail with respect to FIG. 3.

Packet core 16 may be an Internet Protocol (IP) based core network. For example, packet core 16 may be an evolved packet core (EPC) network that is based on end-to-end IP based transmission in and out of the EPC network, e.g., all-IP based. Data and voice may be communicated through EPC via IP packets. Packet core 16 may include one or more serving gateways, packet distribution network gateways and mobile management entities (not shown), among other servers, gateways and entities. Network 18 may include communication networks such as wide area networks, local area networks and the like. Network 18 may provide various voice and data related services, content and the like to user device 12 via packet core 16.

An exemplary TBS table 42 is described with reference to FIG. 2. TBS table 42 associates a transport block size with a respective number of SBs and TBS index. The transport block size corresponds to a number of media access control (MAC) bits that can be transmitted in the subframe or TTI. In particular, $TBS_{x,y}$ corresponds to TBS index (x) and (y) number of SBs. For example, $TBS_{28,100}$ may correspond to a transport block size including one hundred SBs ($SBs_{100}$) and a specific MCS associated with TBS index twenty eight ($TBS_{28}$), i.e., $MCS_{28}$. The higher TBS index number, the greater the channel performance level, e.g., the greater the data throughput. Also, the higher the number of SBs, the greater the data throughput. $TBS_{28,\ 100}$ may correspond to a TBS having the highest, optimum or maximum channel performance level given TBS indices from 0-28 and number of SBs from 0-100. While TBS table 42 is illustrated in FIG. 2 having a specific table size, i.e., TBS indices 0-28 and number of SBs 0-100, one of ordinary skill in the art will recognize that other table sizes and dimensions can be incorporated, e.g., the number of SBs and/or TBS indices may be increased or decreased. For example, TBS table 42 may correspond to the transport block size table defined in $3^{rd}$ Generation Partnership Project Technical Specification (3GPP TS) 36.213 version 10.5.0, the entirety of which is herein incorporated by reference.

An exemplary link quality requirement table 44 is described with reference to FIG. 3. Link quality requirement table 44 associates a predetermined required link quality with a number of SBs and MCS index, i.e., associates a minimum link quality needed to utilize a specific number of SBs and MCS associated with a MCS index to transmit queued data. The required link quality corresponding to a minimum link quality needed to achieve a certain block error rate (BLER). The MCS index corresponds to a specific modulation scheme and channel coding, e.g., quadrature amplitude modulation having four (4) bits per symbol (16QAM) and a specific coding level. For example, link quality requirement $R_{28,100}$ corresponds to a link quality that is required to utilize a MCS corresponding to MCS index twenty eight ($MCS_{28}$) and one hundred SBs ($SB_{100}$) while achieving a targeted operating point such as a block error rate (BLER) with the maximum possible bit rate. $MCS_{28}$ is the maximum or optimum MCS that corresponds to a maximum or optimum channel performance level given $MCS_{0-28}$, i.e., the optimum MCS may correspond to the largest MCS index in table 44 or a minimum of the largest MCS index and maximum supported MCS.

The greater or higher the MCS index, the greater the channel performance level. The greater or higher the number of SBs, greater data throughput or bit rate. While link quality requirement table 44 is illustrated in FIG. 3 having a particular table size, i.e., MCS 0-28 and number of SBs 0-100, one of ordinary skill in the art will recognize that the table size may be adjusted based on system design and/or communication protocol standards, among other factors. For example, link quality requirement table 44 may have a table size corresponding to the table size of TBS table 42, or vice versa.

Figure 4:
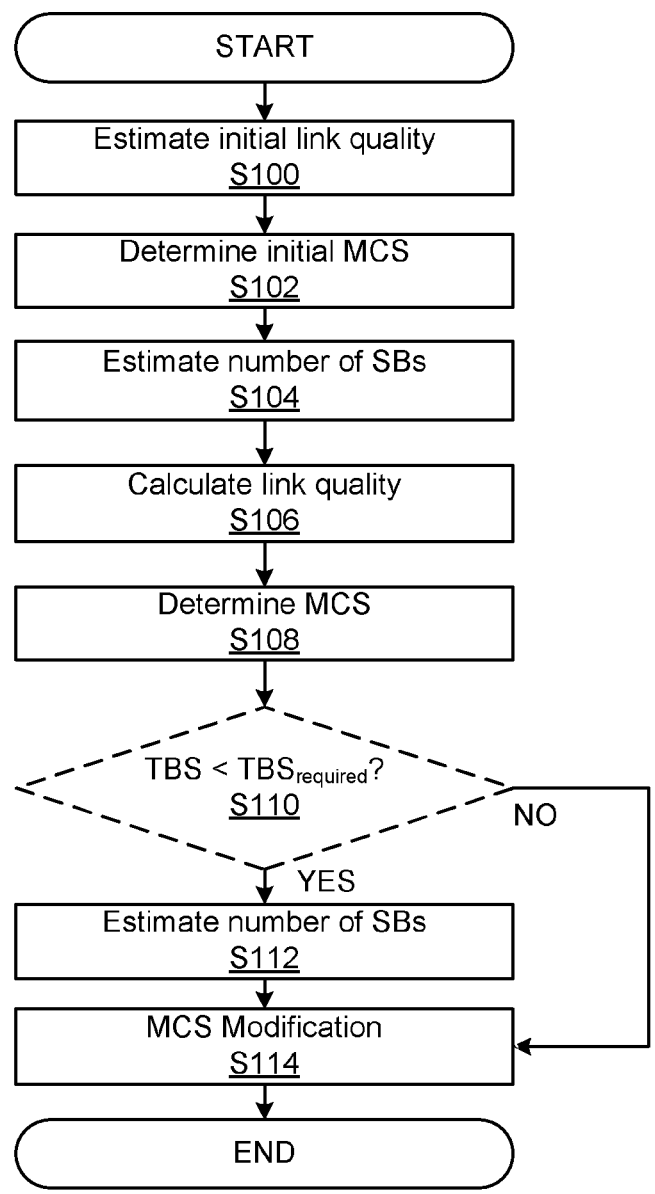
FIG. 4 is a flowchart of an exemplary first modified link adaptation process in accordance with the principles of the present invention.

An exemplary first modified link adaptation process is described with reference to FIG. 4. Processor 24 estimates an initial link quality (Step S100). For example, before SBs have been allocated for user device 12, an estimation of link quality may be made based at least in part on wideband channel quality. For downlink, wideband channel quality may be reported to node 14, by user device 12, via a wideband channel quality indicator (CQI). In particular, the wideband CQI is mapped to one or more quality characteristics, e.g., wideband signal to interference plus noise ratio (SINR). The quality characteristics such as wideband SINR may be filtered to remove fast fluctuations. For example, the filter can be: SINR $(n+1)=(1-\alpha)*SINR(n)+\alpha*sinr(cqi)$, where sinr(cqi) is the SINR mapped from the latest reported CQI, cqi, and $\alpha$ is a forgetting factor. The filter can be adjusted based at least in part on previous transmission successes and/or failures.

Processor 24 determines an initial MCS, i.e., MCS_1, based at least in part on the initial link quality (Step S102). For example, the filtered wideband SINR may be mapped to a MCS via a look up table and/or using other SINR to MCS mapping methods known in the art. Using the wideband CQI allows for Step S100 to be performed outside of a critical scheduling loop, e.g., outside a TTI, when a wideband CQI report is received and/or transmission success/failures are known.

Processor 24 estimates a number of SBs based at least in part on the initial MCS (Step S104). The estimated number of SBs may be a minimum of an initial number of SBs (N_SBs) and a maximum number of available SBs (SBs$_{available}$), i.e., N_SBs_1=min(N_SBs, SBs$_{available}$). The initial number of SBs is an estimate of a number of SBs required to empty the buffer or data queue given a MCS in which the queued data is associated with user device 12. The initial MCS and initial number of SBs correspond to respective values calculated or determined toward the beginning of the modified link adaptation process associated with a data queue, i.e., initial MCS is determined before the first and second MCSs, and the initial number of SBs is determined before the first and second number of SBs. The initial number of SBs may be estimated in several ways. In one embodiment, the initial number of SBs is estimated according to equation (1).

$$N\_SBs=\text{ceiling}\{(1+\text{marginFactor})*TBS_{required}/[\text{bitsPerSB(MCS)}*\text{SBStep}]\}*\text{SBStep} \quad \text{Equation (1)}$$

The marginFactor is a scaling of the required TBS. The marginFactor may be optimized, i.e., increased or decreased, based on simulations or field testing. The required TBS (TBS$_{required}$) corresponds to a target TBS determined based on a desired TBS (TBS$_{desired}$), predefined minimum TBS (TBS$_{min}$) and predefined maximum TBS (TBS$_{max}$). In particular, the required TBS may be the minimum of TBS$_{max}$ and a maximum of the TBS$_{desired}$ and TBS$_{min}$, i.e., TBS$_{required}$=min(max(TBS$_{desired}$, TBS$_{min}$), TBS$_{max}$). The desired TBS corresponds to the number of data bits in queue for user device 12. The minimum TBS corresponds to the smallest TBS that can carry an amount of user data that one of ordinary skill would consider suitable given a particular network implementation and performance requirements. The minimum TBS may be predetermined based on communications protocols and/or may be set by a network operator based on design considerations.

The maximum TBS may be based on user device 12 and/or node 14 capabilities, e.g., the maximum TBS supported by user device 12 and/or node 14. The maximum TBS may be predetermined based on communication protocols in accordance with LTE wireless communication standards and/or may be set by a network designer based on design considerations, among other factors. The bitsPerSB(MCS) is the average number of bits per SB calculated using the TBS table defined in 3GPP TS 36.213 version 10.5.0 given a MCS level or index, i.e., using TBS table 42. SBStep corresponds to a granularity of SB assignment. SBStep may correspond to a minimum number of SBs that can be allocated at a time, i.e., one or more SBs may be assigned or allocated at a time.

In another embodiment, the initial number of SBs is estimated according to equation (2).

$$N\_SBs\_2=N\_SBs\_1+\text{ceiling}\{((1+\text{marginFactor})*TBS_{required}-TBS)/(\text{BitsPerSB(MCS)}*\text{SBStep})\}*\text{SBStep} \quad \text{Equation (2)}$$

N_SBs_1 corresponds to a previous estimation of the number of SBs. TBS is calculated based at least in part on a number of SBs and MCS, e.g., N_SBs_1 and MCS. The MCS is maintained while a number of SBs are estimated using equation (2).

In yet another embodiment, the initial number of SBs is estimated according to Equation (3).

$$N\_SBs\_2=\text{ceiling}\{N\_SBs\_1*(1+\text{marginFactor})*TBS_{required}/(TBS*SBStep)\}*SBStep \quad \text{Equation (3)}$$

The N_SBs_1 corresponds to a previous estimation of the number of SBs. The MCS is maintained while a number of SBs are estimated using equation (2).

In yet another embodiment, the initial number of SBs is estimated as the maximum value from equation (1), equation (2) and equation (3). In yet another embodiment, TBS table 42 is searched to find a TBS corresponding to a given number of SBs, e.g., N_SBs_1 or N_SBs_2, as discussed in detail below with respect to FIG. 5.

The embodiments discussed above with respect to determining the number of SBs may be grouped into at least two categories: one category involves using one or more equations to calculate the number of SBs and the second category involves using TBS table 42 to determine the number of SBs. The first category is less complex and faster than the second category, but the second category yields more accurate results as compared with the first category.

Figure 5:
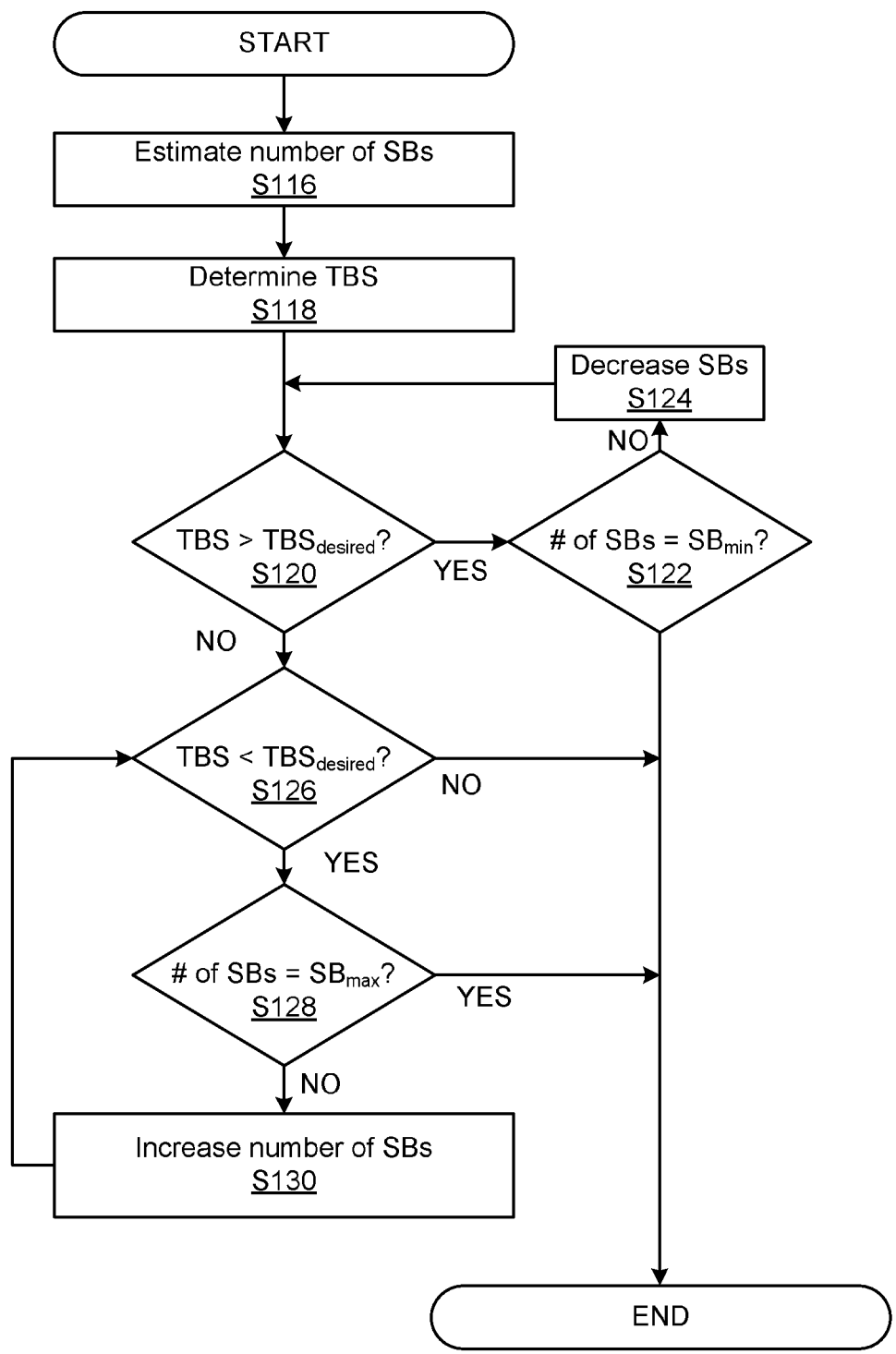
FIG. 5 is a flowchart of an exemplary scheduling block (SB) estimation process in accordance with the principles of the present invention.

Referring back to Step S104, after the number of SBs is estimated, i.e., using the SB estimation process of FIG. 5, a link quality associated the number of SBs may be calculated (Step S106). The link quality may be calculated or estimated based at least in part on a wideband channel quality associated with the number of SBs, e.g. associated with a current number of SBs, as discussed above with respect to Step S100. Processor 24 may determine the MCS based at least in part on the estimated link quality (Step S108). The MCS such as MCS_2 may be determined by searching link quality requirement table 44 for a minimum MCS. For example, the link quality requirement table 44 is searched for a minimum MCS given a number of SBs (i.e., N_SB_1) that satisfies a link quality threshold. The link quality threshold may be the calculated link quality divided by the required link quality that is greater than or equal to one minus a link quality margin, i.e., (calculated link quality/required link quality)≥(1−link quality margin). The required link quality is given by $R_{x,y}$, where x is the MCS index and y is the number of SBs such that the required link quality $R_{x,y}$ indicates a minimum link quality needed to utilize a MCS corresponding to MCS index (x) and a number of SBs (y). The current MCS may be updated to correspond to the minimum MCS associated with the minimum MCS index, i.e., updated to correspond to MCS_1 after MCS_1 is determined.

Processor 24 may determine whether the TBS is less than the required TBS (Step S110). For example, the current TBS may be determined based at least in part on the current number of SBs and the current MCS. If the determination is made that TBS is less than the required TBS, processor 24 estimates the number of SBs as discussed above with respect to Step S104 (Step S112). For example, the number of SBs may be estimated as discussed below with respect to FIG. 5. After the number of SBs has been estimated, processor 24 may perform the MCS modification process as discussed in detail with respect to FIG. 6 (Step S114). The current MCS and number of SBs may be updated after MCS modification, and the operating MCS and number of SBs may be set to the current MCS and number of SBs for a data queue such that a data queue associated with user device 12 is scheduled for transmission using the operating MCS, number of SBs and TBS, i.e., the operating TBS is determined based on the operating MCS and number of SBs such that the queued data is scheduled for transmission based at least in part on the operating TBS.

Referring back to Step S110, if the determination is made that the TBS is greater than or equal to the required TBS, the MCS modification process may be performed, i.e., the estimation step of S112 is skipped. Alternatively, the TBS requirement step of S110 may be an optional step or operation such that Step S110 may be excluded in one or more embodiments. For example, after the MCS is determined in Step S108, the number of SBs may be estimated (Step S112) without determining whether the TBS is less than the required TBS. Step S112 may not be skipped when the TBS is greater than the required TBS. Skipping Step S112 allows one less step to be performed while still meeting the link quality requirement. Even though skipping Step S112 may lead to more SBs being used than are actually needed, the processing time for modified link adaptation is reduced.

An exemplary process for estimating an initial number of SBs is described with reference to FIG. 5. A number of SBs may be estimated (Step S116). For example, one of equation (1), equation (2), equation (3) and max(equation (1), equation (2), equation 3) may be used to estimate a number of SBs that will serve as a starting point for a TBS search. Alternatively, a previously estimated number of SBs may be used. Processor 24 determines a TBS based at least in part on the number of SBs estimated in Step S116 and the MCS (Step S118), i.e., based at least in part on the current number of SBs and current MCS. Processor 24 determines whether the TBS corresponding to the given number of SBs and MCS is less than or equal to the desired TBS ($TBS_{desired}$) (Step S120). If the determination is made that the TBS is greater than the desired TBS, processor 24 determines whether the number of SBs is equal to a minimum number of SBs (Step S122). If the determination is made that the number of SBs, e.g. current number of SBs, is not equal to the minimum number of SBs, the number of SBs is decreased by SBStep (Step S124). After decreasing the number of SBs, the determination of Step S120 may be repeated. Referring back to Step S122, if the number of SBs is determined to be equal the minimum number of SBs, the estimation process may end, i.e., SBs cannot be further reduced during the SB estimation process.

Referring back to Step S120, if the determination is made that TBS is not greater than the desired TBS, a determination is made whether the TBS is less than the desired TBS, i.e., whether the current TBS is less than the desired TBS (Step S126). If the determination is made that the TBS is not less than the desired TBS, the estimation process may end. If the determination is made that the TBS is less than the desired TBS, process 24 determines whether the number of SBs equals a maximum number of available SBs ($SB_{available}$) (Step S128). If the determination is made that the number of SBs, i.e., current number of SBs, equals the maximum number of available SBs, the estimation process may end, i.e., the number of SBs cannot be increased during the SB estimation process. If the determination is made that the number of SBs is not equal to the maximum number of available SBs, the number of SBs is increased by SBstep (Step S130). After increasing the number of SBs, the determination of Step S126 may be repeated.

Figure 6:
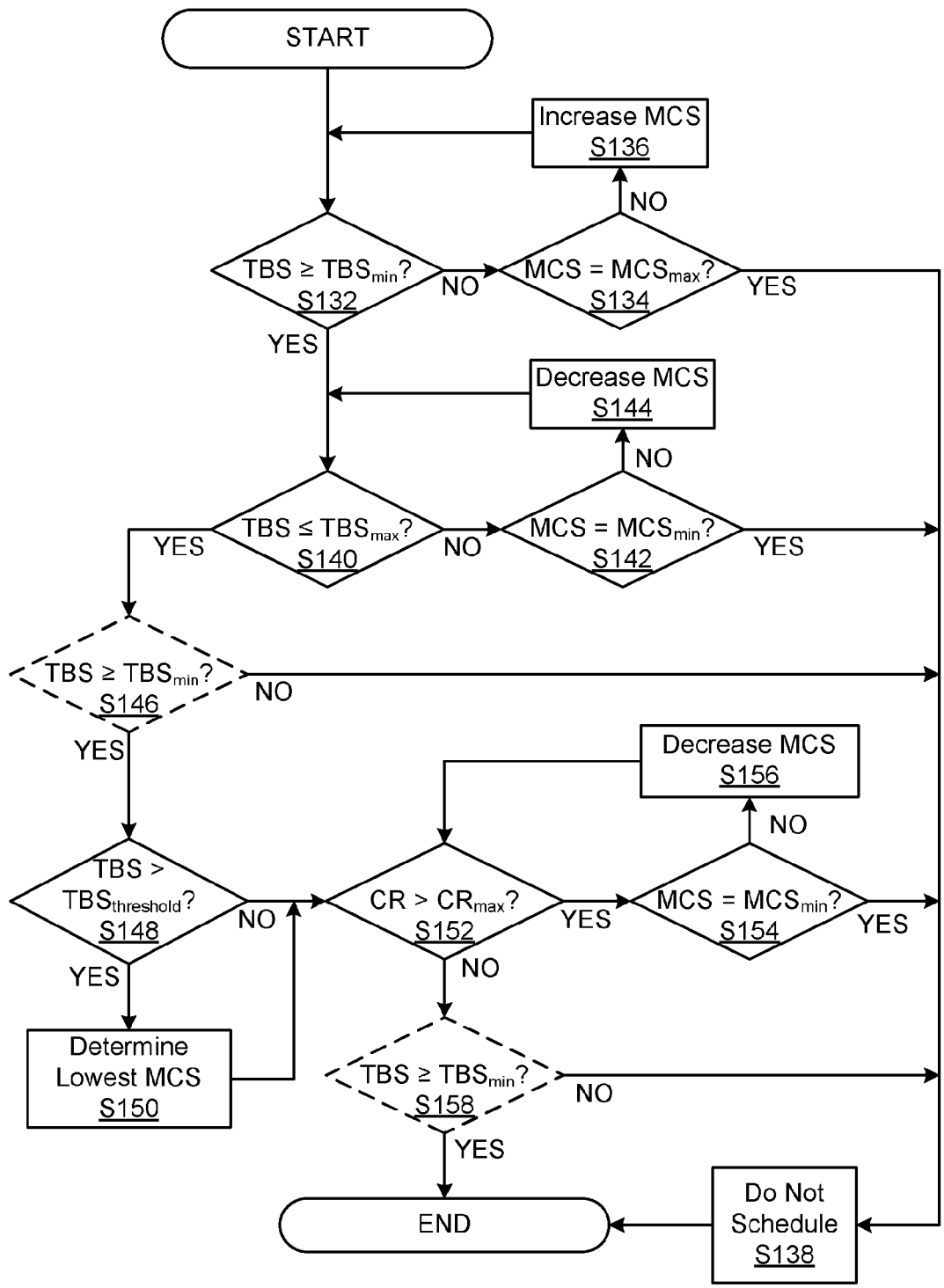
FIG. 6 is a flowchart of an exemplary modulation and coding scheme (MCS) modification process in accordance with the principles of the present invention.

An exemplary MCS modification process is described with reference to FIG. 6. Processor 24 determines whether TBS is greater than or equal to a minimum TBS, i.e., whether $TBS \geq TBS_{min}$ (Step S132). For example, a determination is made whether the TBS associated with the current MCS such as MCS_2 and the current number of SBs such as N_SBs_2 can carry a minimum amount of user traffic or data ($TBS_{min}$). If the TBS is determined not to be greater than or equal to the minimum TBS, processor 24 determines whether the MCS is equal to a maximum MCS, i.e., whether $MCS = MCS_{max}$ (Step S134). If the determination is made that the current MCS does not equal the maximum MCS, the current MCS is increased while keeping the current number of SBs the same, i.e., MCS index is increased by one or more index levels while the number of SBs are keep constant or maintained (Step S136). For example, MCS_2 may be increased while keeping N_SBs_2 the same. The current TBS and MCS may be updated based on the increased MCS. After increasing the MCS, the determination of Step S132 may be repeated.

Referring back to Step S134, if the determination is made that MCS is equal to the maximum MCS, the data queue associated with user device 12 may not be scheduled, i.e., a data queue associated with user device 12 cannot be accommodated during the current TTI (Step S138). For example, the current MCS cannot be increased in order to transmit the smallest TBS that can carry a minimum or reasonable amount of data to user device 12. The modified link adaptation process may be performed again for the data queue during the next TTI in which a greater number of SBs may be available as less or no data queue has been scheduled within the TTI and/or the calculated link quality may change, among other factors may vary per TTI when performing modified link adaptation.

Referring back to Step S132, if the determination is made that TBS is greater than or equal to the minimum TBS, processor 24 determines whether TBS is less than or equal to the maximum TBS, i.e., whether $TBS \leq TBS_{max}$ (Step S140). The maximum TBS may be based at least in part on the capabilities of user device 12 and/or node 14, e.g., a maximum TBS supported by user device 12 associated with the queued data undergoing modified link adaptation. If processor 24 determines the current TBS is not less than or equal to the maximum TBS, a determination is made whether the current MCS is equal to the minimum MCS, i.e., whether $MCS = MCS_{min}$ (Step S142). The minimum MCS may correspond to a minimum or most robust channel performance level, e.g., $MCS_0$ given $MCS_{0-28}$. If processor 24 determines that the MCS is equal to the minimum MCS, the data queue associated with user device 12 may not be scheduled (Step S138). For example, the current MCS cannot be decreased such that the current TBS remains greater than the maximum TBS ($TBS_{max}$). The modified link adaptation process may be performed again for the queued data during the next TTI. If processor 24 determines the current MCS does not equal the minimum MCS, the current MCS is decreased (Step S144). For example, the current MCS such as MCS_2 may be decreased by one or more MCS levels while the current number of SBs are kept constant or maintained. The current TBS may be updated based on the decreased MCS and current number of SBs. After MCS is decreased, the determination of Step S140 may be repeated.

Referring back to Step S140, if the determination is made that the TBS is less than or equal to the maximum TBS, processor 24 may determine whether the current TBS is greater than or equal to the minimum TBS, $TBS_{min}$ (Step S146). The determination of Step S146 may only be performed if the MCS is decreased at Step S144, i.e., Step S146 is skipped if Step S144 is not performed. In particular, the current number of SBs and decreased MCS may correspond to a TBS that is not greater than or equal to the minimum TBS such that the current TBS should be checked after decreasing MCS. Alternatively, the determination of Step S146 may always be performed. If the determination is made that TBS is not greater than or equal to the minimum TBS, the data queue associated with user device 12 may not be scheduled, i.e., a data queue associated with user device 12 cannot be accommodated during the current TTI (Step S138). If the determination is made that TBS is greater than or equal to the minimum TBS, processor 24 determines whether the TBS is greater than a threshold TBS, i.e., whether $TBS > TBS_{threshold}$ (Step S148). The TBS threshold may correspond to a TBS obtained by multiplying the required TBS by a margin, i.e., $TBS_{threshold} = TBS_{required} * TBS_{margin}$. The TBS margin is a value greater than one or a scaling that can be optimized through simulations and/or field testing, and may be configurable during link adaptation.

If the determination is made that TBS is greater than the threshold TBS, processor 24 may determine a lowest MCS (Step S150). The lowest MCS may correspond to a lowest temporary MCS ($MCS_{temp}$) that is less than or equal to the current MCS in which a TBS based at least in part to the temporary MCS is greater than or equal to the required TBS, i.e., lowest $MCS_{temp}$ is determined such that $MCS_{temp} \leq MCS$ and TBS ($MCS_{temp}$) $\geq TBS_{required}$. The current MCS and TBS may be updated after Step S150 is performed, and Step S152 may be performed as discussed below.

Referring back to Step S148, if the determination is made that TBS is not greater than the threshold TBS, processor 24 determines whether a code rate is greater than a maximum code rate (Step S152). The code rate (CR) is determined based at least in part on the current MCS and/or current number of SBs, i.e., the current MCS indicates a specific code rate. The maximum code rate ($CR_{max}$) is a maximum code rate supported by user device 12 and/or node 14. If the determination is made that the code rate is greater than the maximum code rate, processor 24 determines whether the current MCS is equal to the minimum MCS (Step S154). If the determination is a made that MCS is equal to the minimum MCS, the data queue associated with user device 12 may not be scheduled, i.e., a data queue associated with user device 12 cannot be accommodated during the current TTI (Step S138). For example, the current MCS cannot be decreased such that the code rate remains greater than the maximum code rate. If the determination is made that MCS is not equal to the minimum MCS, the MCS is decreased (Step S156). For example, the current MCS may be decreased by one or more MCS levels. After MCS is decreased, the determination of Step S152 may be repeated.

Referring again to Step S152, if the determination is made that the code rate is not greater than the maximum code rate, processor 24 may determine whether the current TBS is greater than or equal to the minimum TBS as discussed above with respect to Step S158 (Step S158). In particular, Step S158 may only be performed if the MCS is decreased at Step S156, i.e., Step S158 is skipped if Step S156 is not performed. If the determination is made that the current TBS is not greater than or equal to the minimum TBS, the data queue associated with user device 12 may not be scheduled, i.e., a data queue associated with user device 12 cannot be accommodated during the current TTI (Step S138). If the determination is made that the current TBS is greater than or equal to the minimum TBS, the MCS modification process may end.

Figure 7:
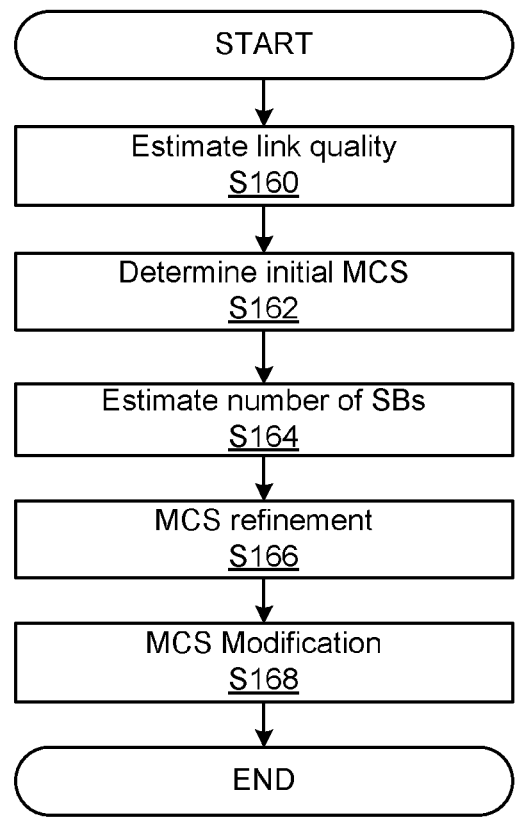
FIG. 7 is a flowchart of an exemplary second modified link adaptation process in accordance with the principles of the present invention.

An exemplary second modified link adaptation process is described with reference to FIG. 7. Processor 24 estimates an initial link quality, e.g., the link quality is estimated based at least in part on the wideband channel quality (Step S160). For example, the initial link quality may be estimated as discussed above with respect to Step S100. Processor 24 determines an initial MCS based at least in part on the initial link quality (Step S162). For example, the initial MCS may be estimated as discussed above with respect to Step S102. Processor 24 estimates a number of SBs, i.e., N_SBs_1, based at least in part on the initial MCS (Step S164). For example, the number of SBs may be estimated as discussed above with respect to Step S104.

Figure 8:
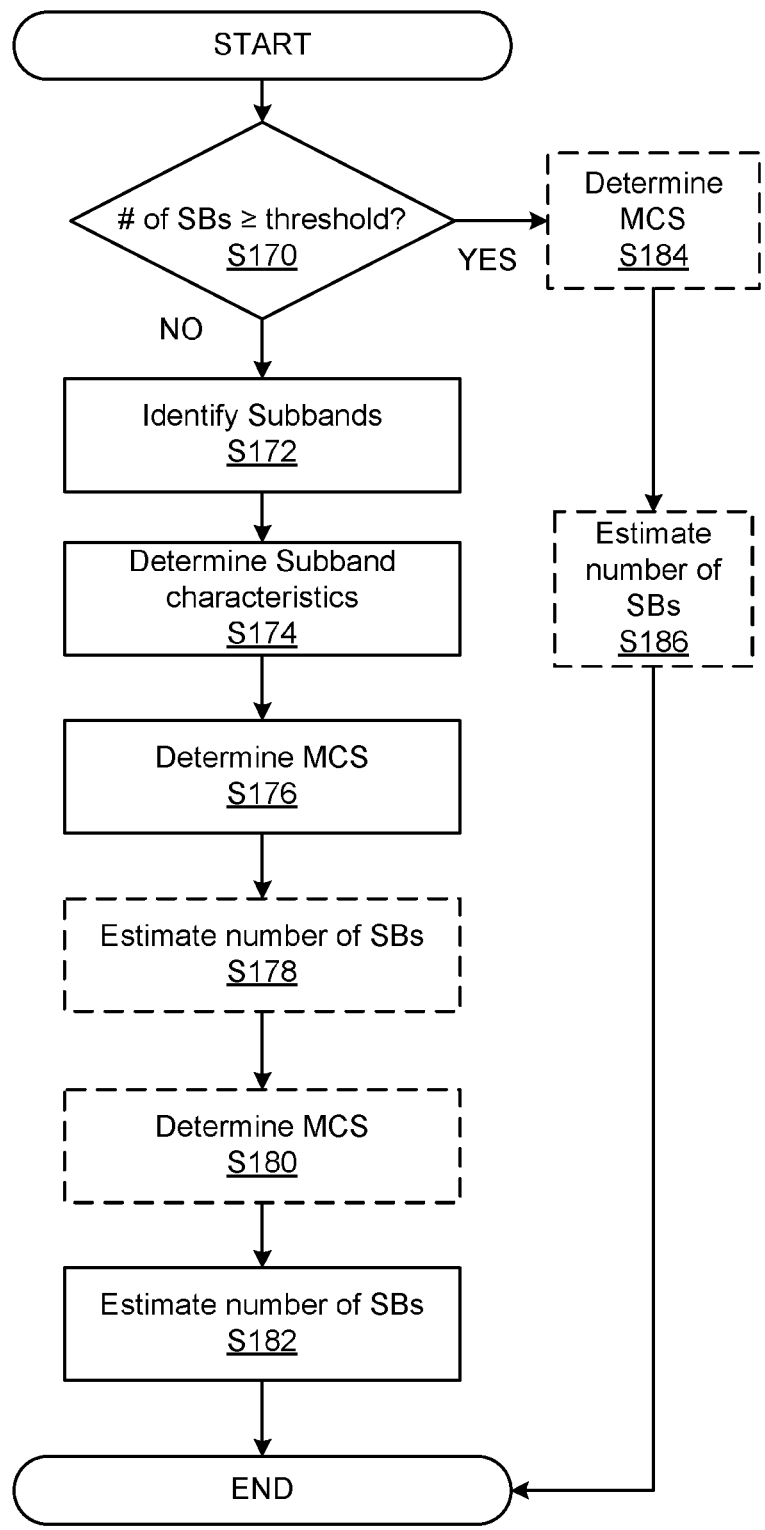
FIG. 8 is a flowchart of an exemplary MCS refinement process in accordance with the principles of the present invention.

Processor 24 may perform the MCS refinement process as discussed in detail with respect to FIG. 8 (Step S166). After MCS refinement, MCS modification may be performed (Step S168). For example, the MCS modification process discussed above with respect to Step S114 may be performed. The current MCS and number of SBs may be updated after modification and/or re-estimation, and the operating MCS and number of SBs may be set to the current MCS and number of SBs such that a data queue associated with user device 12 is scheduled for transmission based at least in part on the operating MCS and number of SBs, i.e., the operating TBS is determined based on the operating MCS and number of SBs such that the queued data is scheduled for transmission based at least in part on the operating TBS.

An exemplary MCS refinement process is described with reference to FIG. 8. Processor 24 determines whether a number of SBs is greater than or equal to a threshold (Step S170). The threshold may correspond to a scaling parameter multiplied by a cellular bandwidth, i.e., threshold=(scaling parameter)*(cellular bandwidth). The scaling parameter may be a value between zero and one that can be optimized using simulations and/or field test. If the determination is made that the number of SBs, i.e., current number of SBs, is less than the threshold, processor 24 identifies one or more subbands associated with the number of SBs (Step S172). After the one or more subbands have been identified, processor 24 determines subband channel characteristics of the identified subbands associated with the number of SBs (Step S174). The subband channel characteristics may include subband signal to interference plus noise ratio (SINR), among other subband channel metrics as are known in the art. For example, the subband CQI may be mapped to a subband SINR. The subband SINR may be filtered to remove fast fluctuations and may be based at least in part on previous data transmissions. A minimum SINR or an average SINR may be determined.

Processor 24 determines MCS based at least in part on the subband channel characteristics (Step S176). For example, a weighted average of the subband channel characteristics may be mapped to a MCS such as MCS_2. Processor 24 may estimate the number of SBs based at least in part on the MCS, i.e., N_SB_2 is estimated based at least in part on the current MCS that was determined in Step S168 (Step S178). For example, a number of SBs may be estimated as described above with respect to Step S104. The MCS may be determined based at least in part on the number of SBs estimated in Step S178 (Step S180). For example, the MCS_3 may be determined given a number of SBs as discussed above with respect to Step S108. Processor 24 may estimate the number of SBs based at least in part the MCS (Step S182). For example, the number of SBs may be estimated based at least in part on the current MCS determined at step S180. Alternatively, Step S178 and S180 may be skipped based on design need, i.e., a faster and/or less complex modified link adaptation process is needed. For example, Step S182 may be performed after Step S176.

Referring back to Step S170, if processor 24 determines that the number of SBs is greater than or equal to the threshold, the MCS may be determined based at least in part on the number of SBs, i.e., MCS_2 is determined based at least in part on N_SBs_2 (Step S184). For example, the MCS may be determined as discussed above with respect Step S108. Processor 24 may estimate a number of SBs based at least in part on the MCS, i.e., based on MCS_3 or the current MCS (Step S186). The number of SBs may be estimated as discussed above with respect to Step S104, e.g., FIG. 5. Alternatively, Steps S184 and S186 may be skipped based on design need, i.e., a faster and/or less complex modified link adaptation process is needed. For example, referring back to Step S170, the MCS refinement process may end if the number of SBs is greater than or equal to the thresholds. MCS refinement allows a link quality requirement associated with a number of SBs, e.g., number of SBs estimated at Step S164, to be checked after estimation or modification. Checking the link quality requirement associated with the estimated number of SBs improves the estimation such that the link quality requirement table is search with a more accurately estimated number of SBs.

Figure 9:
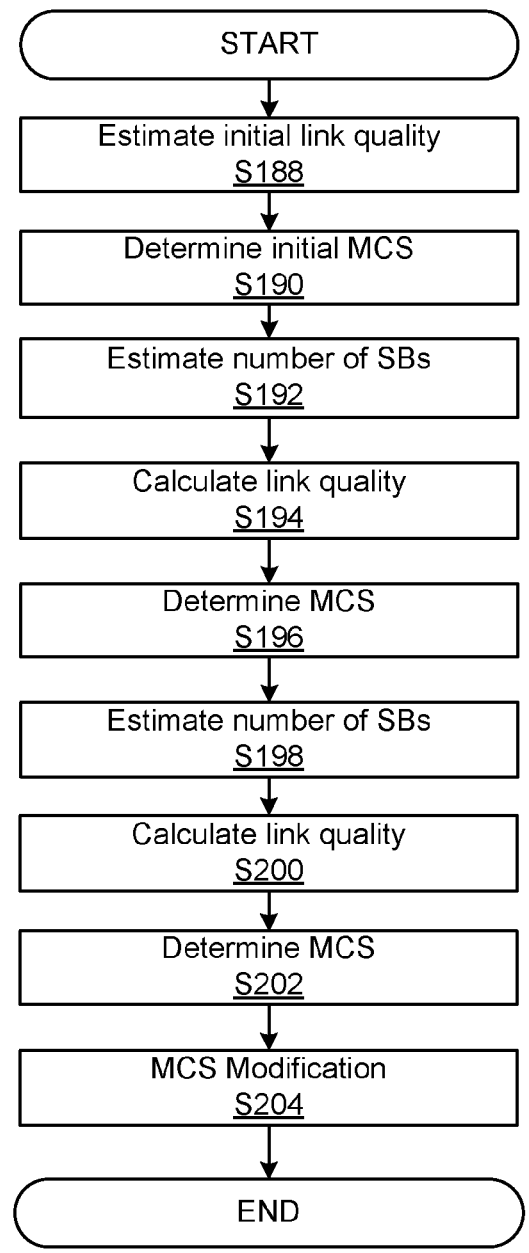
FIG. 9 is a flowchart of an exemplary third modified link adaptation process in accordance with the principles of the present invention.

An exemplary third modified link adaptation process is described with reference to FIG. 9. Processor 24 estimates an initial link quality (Step S188). The third modified link adaptation process may help ensure that the link quality requirement is met. For example, the initial link quality may be estimated as discussed above with respect to Step S100. Processor 24 may determine an initial MCS based at least in part on the initial link quality (Step S190). For example, the initial MCS may be determined as discussed above with respect to Step S102. Processor 24 estimates a number of SBs based at least in part on the initial MCS (Step S192). For example, the number of SBs may be estimated as discussed above with respect to Step S104. Processor 24 calculates the link quality associated with the number of SBs (Step S194). For example, the wideband link quality associated with the number of SBs may be calculated as discussed above with respect to Step S106. Processor 24 determines the MCS, i.e., determines MCS_2 (Step S196). The MCS may be determined as discussed above with respect to Step S108. Processor 24 estimates the number of SBs, i.e., N_SBs_2 (Step S198). For example, the number of SBs may be estimated as discussed above with respect to S104. The link quality associated with the number of SBs, i.e., N_SBs_2, is calculated (Step S200). The link quality may be calculated or estimated based at least in part on a wideband channel quality associated with the number of SBs as discussed above with respect to Step S106. Processor 24 determines the MCS, i.e., MCS_3 (Step S202). For example, MCS is determined based at least in part on the calculated link quality from Step S200, as discussed above with respect Step S188. Processor 24 may perform MCS modification, as discussed above with respect to FIG. 6 (Step S204).

Figure 10:
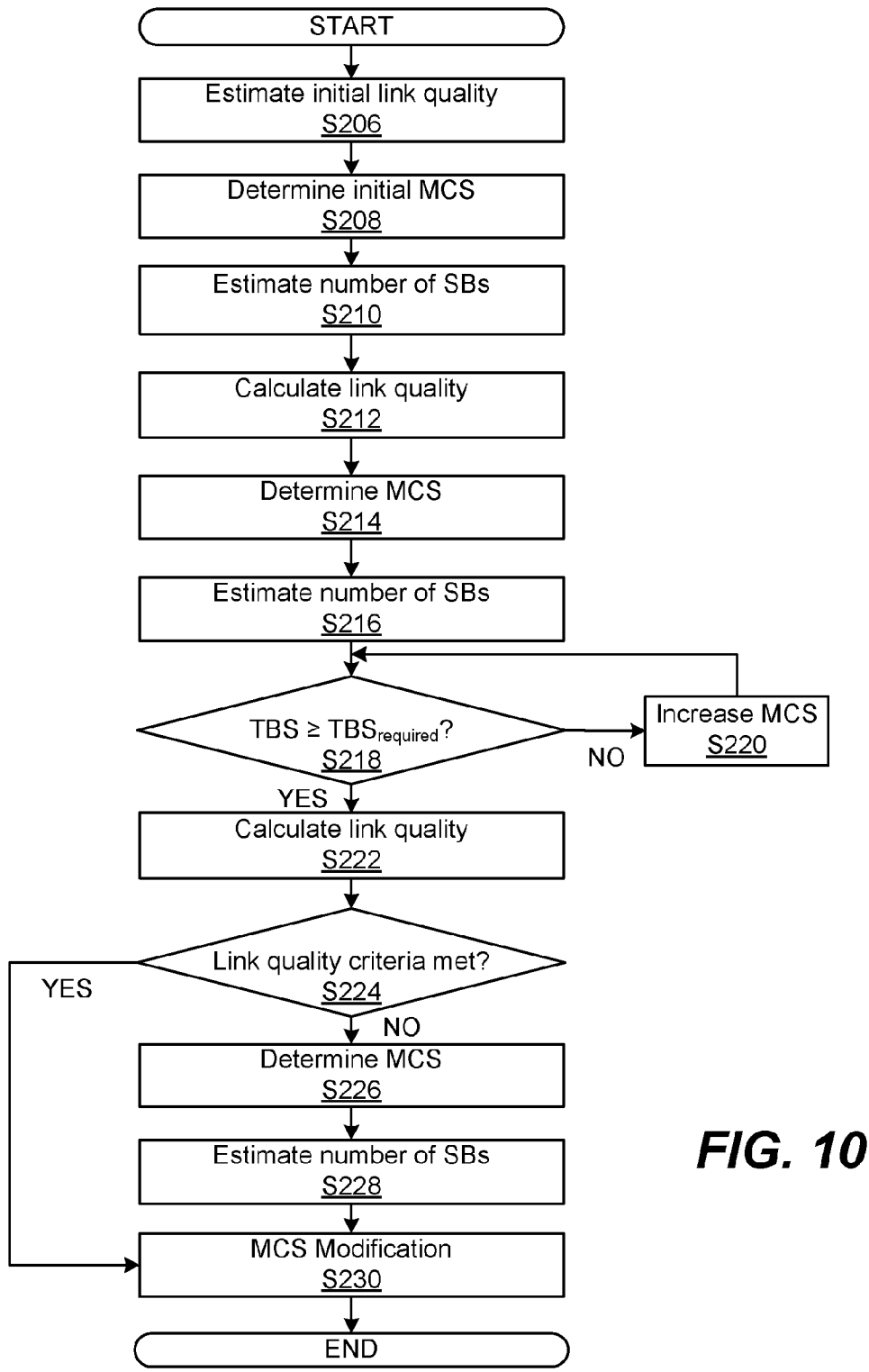
FIG. 10 is a flowchart of an exemplary fourth modified link adaptation process in accordance with the principles of the present invention.

An exemplary fourth modified link adaptation process is described with reference to FIG. 10. Processor 24 performs Steps S206 to S216 that correspond to Steps S188 to S198, respectively, discussed above with respect to FIG. 9. After the number of SBs is estimated at Step S216, processor 24 determines whether the TBS is greater than or equal to the required TBS, i.e., $TBS_{required}$ (Step S218). The TBS may be determined based at least in part on the current number of SBs, i.e., N_SBs_2, and current MCS, i.e., MCS_2. If the determination is made that the TBS is less than the required TBS, the MCS may be increased (Step S220). The MCS, i.e., MCS_2, may be increased by one or more MCS index levels as a time while maintaining the number of SBs. After increasing the MCS, the determination of Step S218 may be repeated. If the TBS is determined to be greater than or equal to the required TBS, the link quality is calculated (Step S222). The link quality may be calculated or estimated based at least in part on a wideband channel quality associated with the number of SBs, i.e., N_SBs_2, as discussed above with respect to Step S106.

Processor 24 determines whether a link quality criteria is met (Step S224). The link quality criteria is met when the calculated link quality divided by required link quality is greater than or equal to one minus the link quality margin, i.e., (calculated link quality)/(required link quality)≥1−link quality margin. If the determination is made that the link quality criteria is not met, the MCS may be determined (Step S226). For example, the highest available MCS that meets the link quality requirement is determined, as discussed above with respect to Step 108. The MCS of Step S226 may be less than the current MCS obtained in Step S220 or Step S214. Processor 24 estimates the number of SBs, i.e., N_SBs_3 (Step S228). For example, the number of SBs may be estimated as discussed above with respect to Step S216. Processor 24 performs the MCS modification process as discussed above with respect to FIG. 6 (Step S230). Referring back to Step S224, if processor 24 determines the link quality criteria is met, MCS modification is performed, i.e., Steps S226 and S228 are skipped (Step S230).

For hybrid automatic repeat request (HARQ) re-transmission, a TBS is given and may not be changed, i.e., re-transmission occurs using the same TBS. In particular, the same MCS and number of SBs used for previous transmission may be used again for HARQ re-transmission. Alternatively, channel conditions may change during HARQ transmission such that modified link adaptation should be performed to take changing channel conditions into account, as discussed below with respect to FIG. 11.

Figure 11:
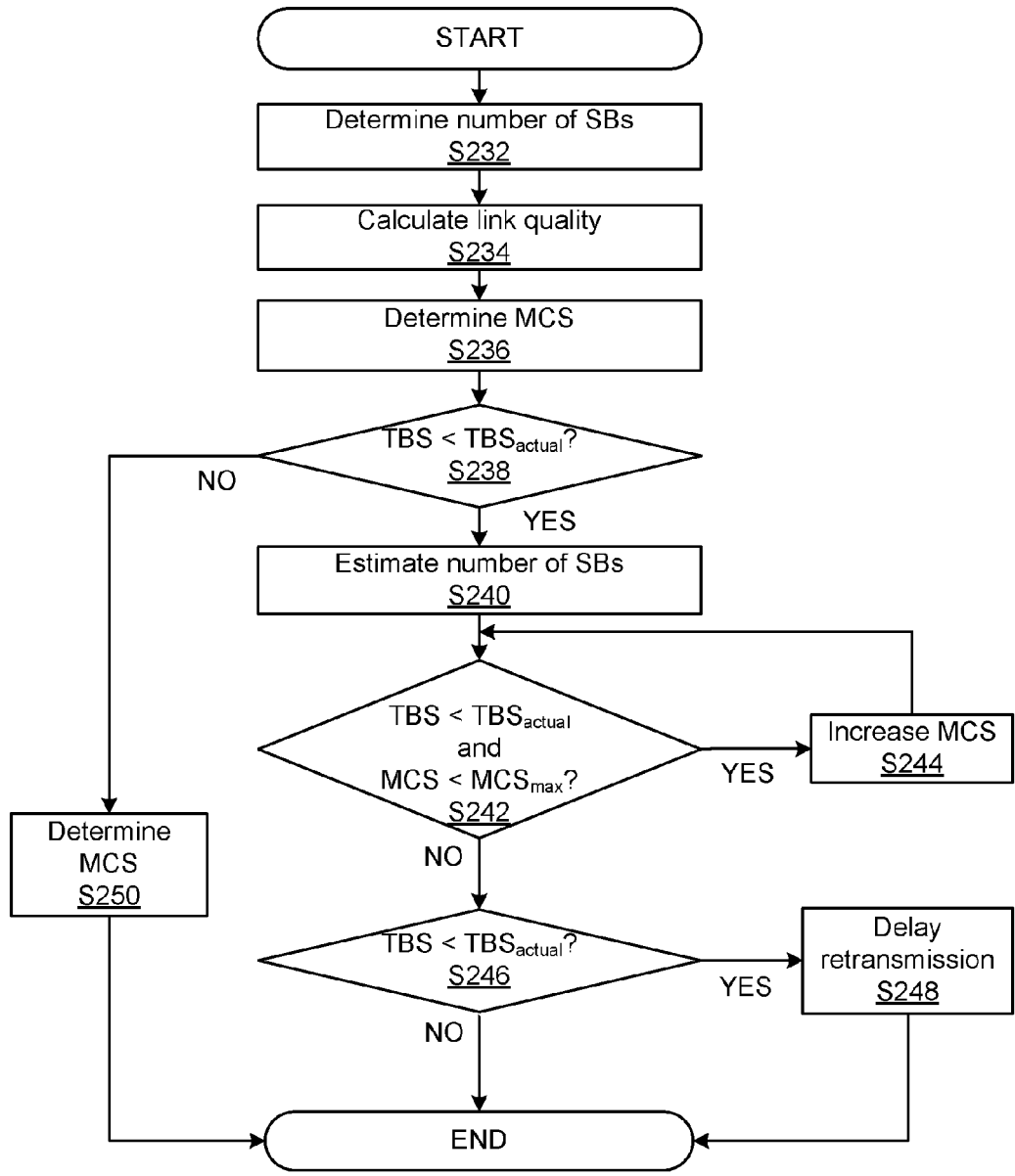
FIG. 11 is a flowchart of an exemplary fifth modified link adaptation process in accordance with the principles of the present invention.

An exemplary fifth modified link adaptation process is described with reference to FIG. 11. Processor 24 determines a number of SBs (Step S232). For example, the number of SBs may be the same as a previous number of SBs used in a prior transmission. Processor 24 may calculate the link quality associated with the number of SBs (Step S234). Processor 24 may determine the MCS, i.e., determines a highest MCS supported by a communication channel based at least in part on the SBs and TBS associated with a previous HARQ transmission (Step S236). For example, the MCS may be determined as discussed above with respect to S108 given the link quality calculated in Step S234. Processor 24 determines whether a TBS is less than the actual TBS (Step S238). The TBS may be the current TBS associated with the current number of SBs, i.e., from Step S232, and current MCS, i.e., from Step S236, corresponding to a TBS index, as determined from TBS table 42. If the determination is made that the TBS is less than the actual TBS, the number of SBs may be estimated (Step S240). For example, the number of SBs may be estimated as discussed above with respect to Step S104, e.g., using the estimation process described in FIG. 5, given the TBS and MCS determined in Step S236. After estimating the number of SBs, processor 24 may determine whether the TBS is less than the actual TBS and whether the MCS is less than the maximum MCS (Step S242). If the determination is made that the TBS is less than the actual TBS and MCS is less than the maximum MCS, the MCS may be increased (Step S244). For example, the current MCS may be increased by one or more MCS index levels. After increasing the MCS, the determination of Step S242 may be repeated. Referring back to Step S238, if the TBS is determined to be greater than or equal to the actual TBS, the MCS may be determined (Step S250).

If processor 24 determines that the TBS is greater than or equal to the actual TBS or that the MCS is equal to the maximum MCS, a determination is made whether TBS is greater than or equal to the actual TBS (Step S246). If the determination is made that the TBS is less than the actual TBS, the data queue associated with user device 12 may be delayed, i.e., delay retransmission (Step S248). Referring back to Step S246, if the determination is made that the TBS is greater than or equal to the actual TBS, the fifth modified link adaptation process may end.

The modified link adaptation processes discussed above with respect to FIGS. 4-10 may be performed using dynamic step selection in which one or more refining steps are performed based on certain conditions. For example, when data associated with user device 12 is being processed, further refinement steps can be taken if there is more time in the overall time that has been allocated to user device 12, else one or more refinement steps are skipped. For example, in FIG. 10, steps S218 to S230 may be considered refining steps that can be skipped if there is not enough time. The overall time for modified link adaptation such as a TTI may be divided equally by the number of user devices 12 to be scheduled, i.e., each user is allocated a time budget. Alternatively, the overall time for modified link adaptation may be divided unequally among user devices 12 to be scheduled. For example, more time may be allocated to earlier modified link adaptation operations/steps, and less time allocated for later modified link adaptation operations or steps.

Another example of dynamic step selection includes starting a timer corresponding to a time budget, e.g., countdown timer, when the required TBS is determined to be greater than a threshold TBS and the time budget for modified link adaptation is not exceeded. The threshold TBS may be adaptively adjusted based on a ratio of the time available for the remaining user devices 12 to be scheduled. Initially, threshold TBS may be set to a small or minimum value. If the ratio becomes smaller, the threshold TBS may be increased to prevent performing refinement for the remaining link adaptation operations or steps. When the timer is expired, processor 24 or a scheduler may only perform one more modified link adaptation operation. The remaining resources will be allocated to the next user device 12 to be scheduled and modified link adaptation will be performed for the user device 12.

In yet another example, of dynamic step selection, refinement may be performed for a fixed number of modified link adaptation operations. For example, processor 24 or scheduler determines whether the required TBS is greater than a threshold TBS and whether the fixed number of modified link adaptation operations for performing refinement is not exceeded, further modified link adaptation operations may be performed.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio resource management apparatus, the apparatus comprising:
  a memory, the memory configured to store data for transmission, the data being associated with a user equipment, UE;
  a processor in communication with the memory, the processor configured to:
    estimate a channel quality;
    determine a first modulation and coding scheme, MCS, based at least in part on the estimated channel quality;
    determine an initial number of scheduling blocks, SBs, required to transmit the stored data based at least in part on the first MCS;
    determine a first number of SBs, the first number of SBs being a minimum of the initial number of SBs and available number of SBs;
    set a current number of SBs to the first number of SBs in response to determining the first number of SBs;
    calculate a link quality based at least in part on a channel condition associated with the first number of SBs;
    determine a second MCS based at least in part on the calculated link quality; and
    set a current MCS to the second MCS in response to determining the second MCS, the stored data being scheduled for transmission based at least in part on the current MCS and current number of SBs.

2. The apparatus of claim 1, wherein the memory further stores a mapping table, the mapping table associating a signal to interference and noise ratio, SINR, with a MCS;
  the estimating the channel quality includes:
    mapping a wideband channel quality indicator, CQI, to the SINR;
    filtering the SINR; and
    adjusting the filtered SINR based at least in part on previous data transmissions, the adjusted filtered SINR being the estimated channel quality; and
  the first MCS is determined by searching the mapping table using the adjusted filtered SINR.

3. The apparatus of claim 1, wherein the processor is further configured to estimate a second number of SBs required to transmit the stored data based at least in part on the second MCS, the second number of SBs being the minimum of a second initial number of SBs and the available amount of SBs.

4. The apparatus of claim 3, wherein the processor is further configured to:
  determine a third MCS corresponding to a minimum MCS associated with a specific transport block size, TBS, that is large enough to transmit the stored data in a single transmission time interval, TTI.

5. The apparatus of claim 4, wherein the processor is further configured to:
determine a transport block size, TBS, based at least in part on the current MCS and current number of SBs;
determine whether the TBS is smaller than a predefined minimum TBS;
increase the current MCS in response to determining the TBS is smaller than the minimum TBS; and
updating the current MCS to the increased current MCS in response to increasing the current MCS.

6. The apparatus of claim 4, wherein the processor is further configured to:
determine a transport block size, TBS, based at least in part on the current MCS and current number of SBs;
determine whether the TBS is greater than a predefined maximum TBS;
decrease the current MCS in response to determining the TBS is greater than a predefined maximum TBS; and
update the current MCS to the decreased current MCS in response to decreasing the current MCS.

7. The apparatus of claim 4, wherein the processor is further configured to:
determine a transport block size, TBS, based at least in part on the current MCS and current number of SBs;
determine whether the TBS corresponds to a code rate that is larger than a maximum code rate supported by a user device;
decrease the current MCS in response to determining the TBS corresponds to the code rate that is larger than the maximum code rate; and
update the current MCS to the decreased current MCS.

8. The apparatus of claim 4, wherein the processor is further configured to:
determine a transport block size, TBS, based at least in part on the current MCS and current number of SBs;
determine whether the TBS is large enough to transmit the stored data in a single transmission time interval, TTI; and
increase the current number of SBs, the increased current number of SBs corresponding to a TBS large enough to transmit the stored data in a single TTI.

9. The apparatus of claim 1, wherein the memory further stores a table, the table associating a signal to interference plus noise ratio, SINR, value to a MCS, the channel condition is a subband channel quality;
the processor is further configured to:
determine whether to modify the first MCS based at least in part on the first number of SBs;
map the subband channel quality to a subband SINR;
filter the subband SINR; and
adjust the filtered subband SINR based at least in part on a previous data transmission; and
perform the weighted average on the adjusted filtered subband SINR, the second MCS is determined by searching the table using the weighted average.

10. The apparatus of claim 9, wherein the processor is further configured to:
estimate a second number of SBs based at least in part on a minimum of a second initial number of the number of SBs required to transmit the stored data and available amount of SBs.

11. The apparatus of claim 4, wherein the processor is further configured to:
estimate a third number of SBs required to transmit the stored data based at least in part on the third MCS, the third number of SBs being a minimum of a third initial number of SBs required to transmit the stored data and an available amount of SBs;
calculate a link quality based at least in part the third number of SBs;
determine a fourth MCS based at least in part on the calculated link quality; and
set the current MCS to the fourth MCS in response to determining the fourth MCS.

12. The apparatus of claim 1, wherein the process is further configured to determine an average number of bits transmitted per SB using the first MCS, the first number of SBs being determined based at least in part on the determined average number of bits per SB.

13. A radio resource management method, the method comprising:
storing data for transmission, the stored data being associated with a user equipment, UE;
estimating a channel quality;
determining a first modulation and coding scheme, MCS, based at least in part on the estimated channel quality;
determining an initial number of scheduling blocks, SBs, required to transmit the stored data based at least in part on the first MCS;
determining a first number of scheduling blocks, SBs, the first number of SBs being a minimum of the initial number of SBs and available number of SBs;
setting a current number of SBs to the first number of SBs in response to determining the first number of SBs;
calculating a link quality based at least in part on a channel condition associated with the first number of SBs;
determining a second MCS based at least in part on the calculated link quality; and
setting a current MCS to the second MCS in response to determining the second MCS, the stored data being scheduled for transmission based at least in part on the current MCS and current number of SBs.

14. The method of claim 13, further comprising storing a mapping table, the mapping table associating a signal to interference and noise ratio, SINR, with a MCS;
the estimating the channel quality including:
mapping a wideband channel quality indicator, CQI, to the SINR;
filtering the SINR; and
adjusting the filtered SINR based at least in part on previous data transmissions, the adjusted filtered SINR being the estimated channel quality; and
the first MCS is determined by searching the mapping table using the adjusted filtered SINR.

15. The method of claim 13, further comprising estimating a second number of SBs required to transmit the stored data based at least in part on the second MCS, the second number of SBs being the minimum of a second initial number of SBs and the available amount of SBs.

16. The method of claim 13, further comprising:
determining a transport block size, TBS, based at least in part on the current MCS and current number of SBs;
determining whether the TBS is smaller than a predefined minimum TBS;
increasing the current MCS in response to determining the TBS is smaller than the predefined minimum TBS; and
updating the current MCS to the increased current MCS in response to increasing the current MCS.

17. The method of claim 13, further comprising:
determining a transport block size, TBS, based at least in part on the current MCS and current number of SBs;

determining whether the TBS is greater than a predefined maximum TBS;

decreasing the current MCS in response to determining the TBS is greater than the predefined maximum TBS; and updating the current MCS to the decreased current MCS in response to decreasing the current MCS.

18. The apparatus of claim 13, further comprising:

determining a transport block size, TBS, based at least in part on the current MCS and current number of SBs;

determining whether the TBS corresponds to a code rate that is larger than a maximum code rate supported by a user device;

decreasing the current MCS in response to determining the TBS corresponds to the code rate that is larger than the maximum code rate; and updating the current MCS to the decreased current MCS in response to decreasing the current MCS.

19. The method of claim 13, further comprising:

determining a transport block size, TBS, based at least in part on the current MCS and current number of SBs;

determining whether the TBS is large enough to transmit the stored data in a single transmission time interval, TTI; and increasing the current number of SBs, the increased current number of SBs corresponding to a TBS large enough to transmit the stored data in a single TTI.

20. The method of claim 13, further comprising:

storing a table, the table associating a signal to interference plus noise ratio, SINR, value to a MCS, the channel condition being a subband channel quality;

determining whether to modify the first MCS based at least in part on the first number of SBs;

mapping the subband channel quality to a subband SINR;

filtering the subband SINR;

adjusting the filtered subband SINR based at least in part on a previous data transmission; and performing the weighted average on the adjusted filtered subband SINR, the second MCS being determined by searching the table using the weighted average.

21. A radio resource management apparatus, the apparatus comprising:

a memory, the memory configured to store data for retransmission associated with a user equipment, UE; and a processor in communication with the memory, the processor configured to:

determine a first number of scheduling blocks, SBs, based at least in part on a number of previously used SBs;

calculate a link quality corresponding to a channel condition associated with the first number of SBs;

determine a first modulation and coding scheme, MCS, based at least in part on the first number of SBs and calculated link quality;

set a current MCS to the first MCS in response to determining the first MCS; and schedule the stored data for retransmission based at least in part on the current MCS;

the memory is further configured to store a table, the table associating a link quality requirement with a number of SBs and MCS, the first MCS being determined by searching the table using the first number of SBs and comparing the calculated link quality with a link quality requirement; and the processor being further configured to:

determine a transport block size, TBS, based at least in part on the first number of SBs and first MCS;

determine whether the TBS is greater than a transport block size for a previous HARQ transmission;

increase the first number of SBs in response to determining the TBS is smaller than the transport block size for the previous HARQ transmission;

set a current number of SBs to the increased first number of SBs;

determine an updated TBS based at least in part on the current number of SBs and the current MCS;

determine whether the updated TBS is equal to the transport block size for the previous HARQ transmission; and adjust the current MCS in response to determining the updated TBS is not equal to the transport block size for the previous HARQ transmission.

* * * * *

UNITED STATES PATENT AND TRADEMARK OFFICE
CERTIFICATE OF CORRECTION

PATENT NO. : 8,761,108 B2
APPLICATION NO. : 13/532144
DATED : June 24, 2014
INVENTOR(S) : Ren et al.

Page 1 of 1

It is certified that error appears in the above-identified patent and that said Letters Patent is hereby corrected as shown below:

IN THE CLAIMS:

In Column 19, Line 7, in Claim 18, delete "The apparatus" and insert -- The method --, therefor.

Signed and Sealed this
Twenty-first Day of April, 2015

Michelle K. Lee
*Director of the United States Patent and Trademark Office*